Nov. 26, 1946. H. E. SOMES 2,411,698
INDUCTION HEAT TREATING APPARATUS
Filed May 10, 1941 10 Sheets-Sheet 1

INVENTOR
Howard E. Somes
BY John P. Tarbox
ATTORNEY

Nov. 26, 1946.  H. E. SOMES  2,411,698
INDUCTION HEAT TREATING APPARATUS
Filed May 10, 1941    10 Sheets-Sheet 7

INVENTOR
Howard E. Somes
BY John P. Tarbox
ATTORNEY

FIG.14

Patented Nov. 26, 1946

2,411,698

UNITED STATES PATENT OFFICE 2,411,698

INDUCTION HEAT-TREATING APPARATUS

Howard E. Somes, Detroit, Mich., assignor, by mesne assignments, to The Budd Company, Philadelphia, Pa., a corporation of Pennsylvania Application May 10, 1941, Serial No. 392,867

10 Claims. (Cl. 266—4)

This invention relates to heat treating apparatus and more particularly to heat treating apparatus adapted to heat treat the internal surface of tubular or cylindrical members.

The apparatus is especially adapted to hold a cylindrical hollow member and rotate the same while at the same time progressively move the hollow member relative to a heating head and a quench head to heat treat the same from one end to the other. The apparatus is adapted to accurately hold the hollow member in place during the heat treating operation and to move the same longitudinally relative to the heating and quench heads at an accurately controlled rate of speed and to perform the operations rapidly, automatically and safely. The invention constitutes an improvement over the apparatus disclosed in Patent No. 2,281,297 and Patent No. 2,281,331, both dated April 28, 1942.

An object of the invention is to provide heat treating apparatus having automatic control over the operation and relative movement of the various parts and in which time control is coordinated with the relative movement of these parts.

Another object is to provide automatic control for apparatus of the type set forth in which a high degree of safety against possible damage and trouble is assured.

Another object is to provide in an induction heat treating apparatus means whereby operation of the same cannot proceed until the workpiece to be heat treated is in proper position for heat treatment.

Another object is to provide in an induction heat treating apparatus having a fluid cooled inductor, means whereby electric current cannot be delivered to the inductor until a predetermined flow of cooling fluid through the inductor is established.

The above and other novel features of the invention will appear more fully hereinafter from the following detailed description when taken in conjunction with the accompanying drawings. It is to be expressly understood, however, that the drawings are employed for purposes of illustration only and are not designed as a definition of the limits of the invention.

In the drawings which illustrate a suitable embodiment of the invention.

Figures 1, 2:
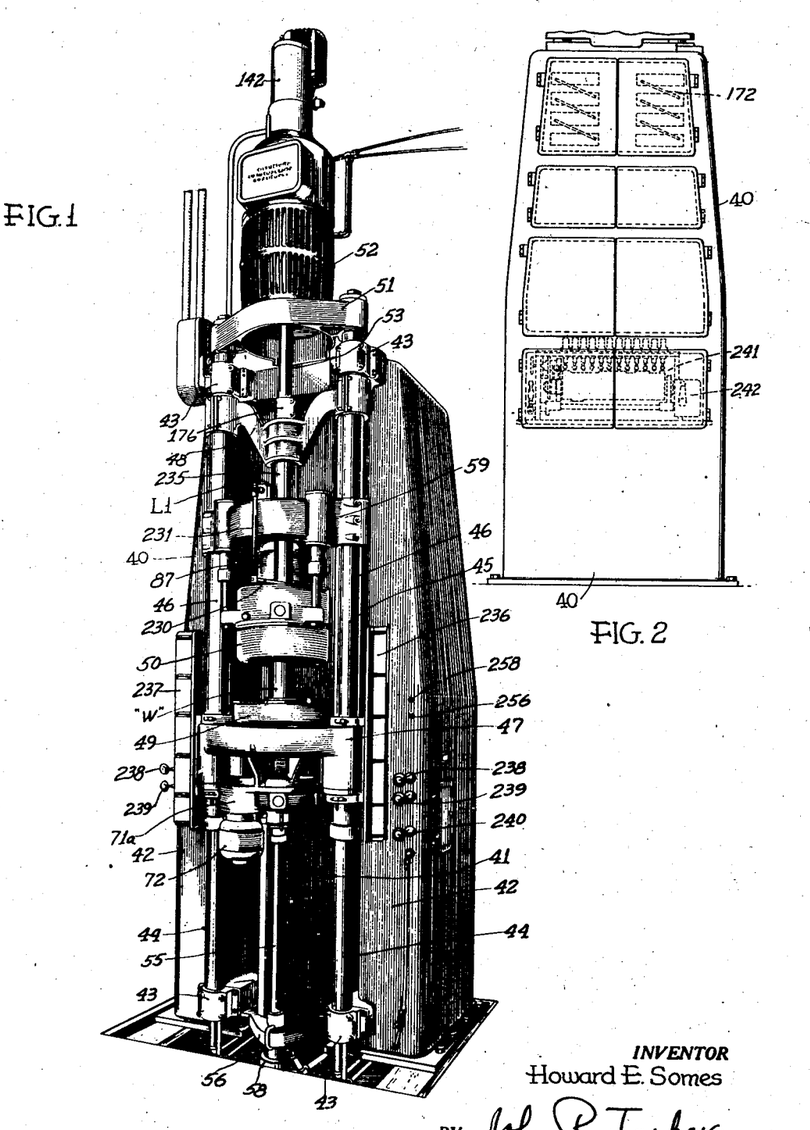
Figure 1 is a perspective view looking toward the front and one side of the apparatus and illustrating its general arrangement.
Figure 2 is a rear elevation of the apparatus.

Referring to the drawings, in which like numerals refer to like parts throughout the several views, particularly Figure 1, there is generally illustrated a heat treating apparatus including a rigid upright frame 40 of hollow box section having a vertical recess 41 in the front face thereof which, in effect, provides spaced vertical side columns 42. Secured to the columns 42 by upper and lower end clamping members 43 is a pair of spaced upright parallel carriage guide rods 44 upon which a reciprocable work supporting carriage 45 is mounted. The carriage includes sleeves or cylinders 46 surrounding the guide rods 44 and connected together by a lower chuck support 47, an upper chuck support 59 and an uppermost bridge member 48.

The workpiece W to be heat treated, which, for example, may be a liner for an internal combustion engine cylinder, is supported, in proper position for the heat treating operations to be performed thereon, between lower and upper chuck fixtures 49 and 50 (to be later described) respectively carried by the chuck supports 47 and 48.

Supported on the upper ends of the guide rods 44 by a cross member 51 is a switching transformer, generally designated 52, and depending from the transformer 52 is an electrical conductor arbor 53 having an induction heating head 54 (see Figure 3) at its lower end.

A quenching apparatus, generally designated 55 is supported in axial alignment with the arbor 53 by a bracket 56 provided at the lower portion of the frame between the guide rods 44, the nozzle 57 (see Figure 3) of which is within the chuck fixture 49 and the elevating and retracting mechanism 58 therefor is disposed below the bracket 56.

It will be observed that the rigid frame 40, the bracket 56, the guide rods 44, and the cylinders 46 bridged by the members 47, 48 and 59 are sufficient to provide a rigid supporting means for maintaining the arbor 53, the workpiece W and quenching apparatus 55 in accurate axial alignment with one another for precision work.

Figure 3:
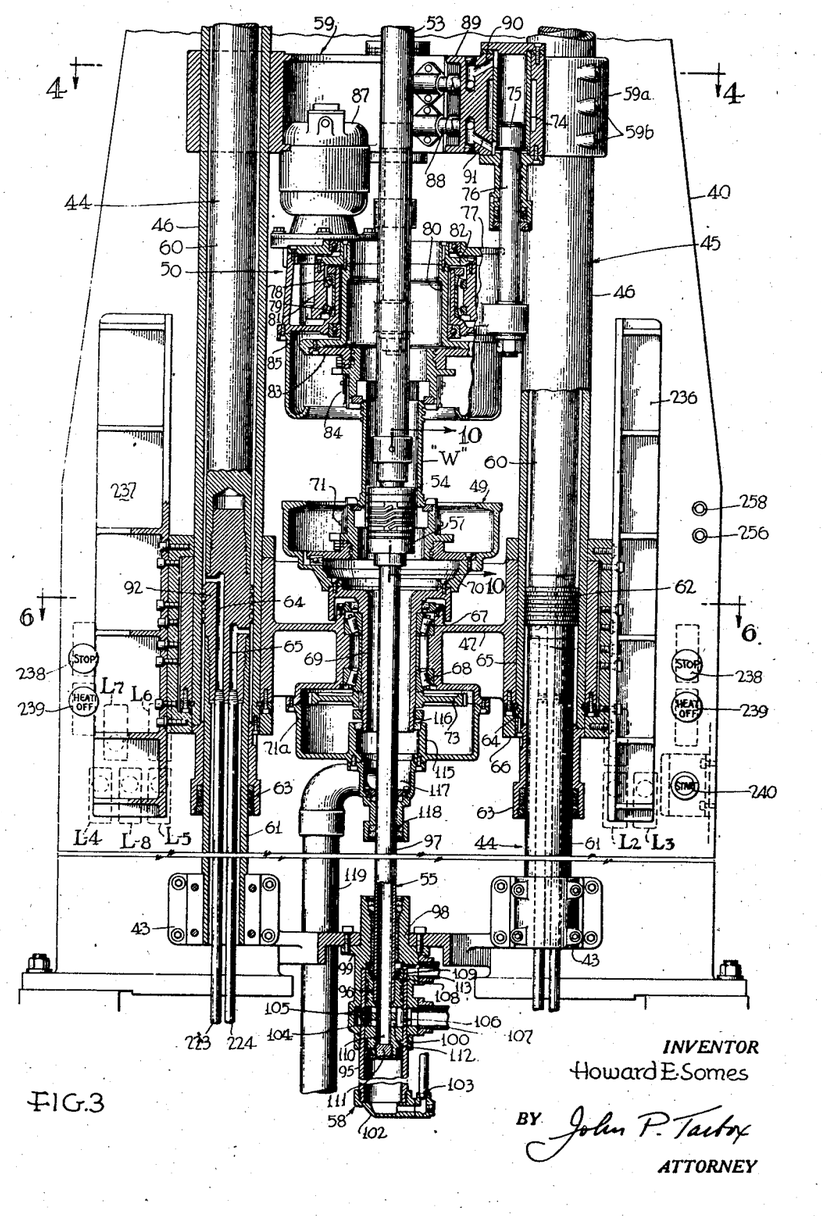
Figure 3 is an enlarged front view of the central portion of the apparatus, parts thereof being in section to better illustrate certain details thereof.
Figures 4, 5:
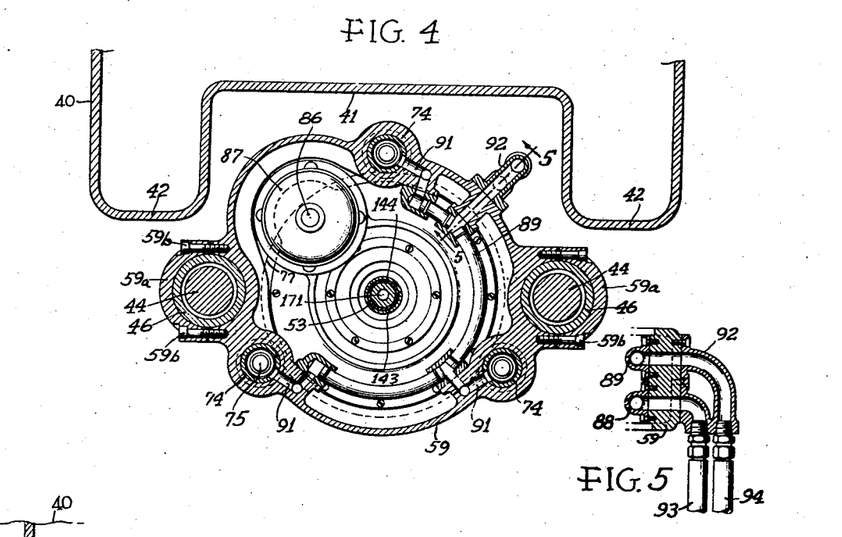
Figure 4 is a transverse section taken substantially on line 4—4 of Figure 3.
Figure 5 is a sectional view taken on line 5—5 of Figure 4.
Figure 6:
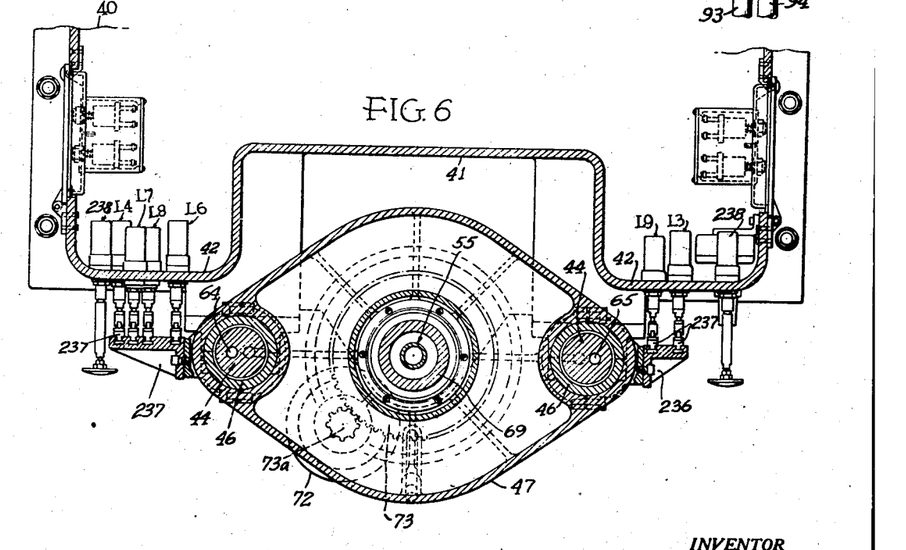
Figure 6 is a transverse section taken substantially on line 6—6 of Figure 3.

Referring to Figure 3 wherein the central portion of the apparatus is illustrated in enlarged section, it will be observed that the guide rods 44 are each comprised of an upper member 60 and a lower tubular member 61 threadedly joined together by an intermediate piston member 62. Each of the carriage sleeves 46 constitutes a cylinder adapted to cooperate with a piston member 62 and having its ends slidably sealed on the guide rod 44 by packing glands 63. Each sleeve thus forms a double acting cylinder. Fluid under pressure is admitted and discharged through ports 64 and 65 above and below the piston member 62 into the cylinder to effect reciprocation of the carriage 45, it being understood that admission of fluid above the piston members 62 will elevate the carriage and admission of fluid below the piston members 62 will lower the carriage.

The main lower fixture support 47 is bored at its ends to receive the sleeves 46 and is secured to the sleeves 46 by split annular keys 64 arranged partly in annular grooves in the sleeves and between the lower ends of the sleeve receiving bores 65 and the retaining collars 66. The support 47 is provided with a central vertical opening within which antifriction bearings 67 and 68 are supported to rotatably support an annular spindle 69 to which is secured an annular work supporting member 70 of the lower fixture 49.

The member 70 supports an annular chuck 71 of the resilient finger type such as is shown in my Patent No. 2,288,037, issued June 30, 1942, the chuck being adapted to grip the lower end of the workpiece W.

The lower end of the member 43 is provided with an annular housing 71a which surrounds gear 73 secured to the spindle 69. The housing 71a supports motor 72, the shaft of which carries a pinion 73a meshed with gear 73 for rotating the lower chuck 71.

In order to support a tubular article of considerable length such as the workpiece W in accurate alignment with the heating head 54 and quenching head 57 the upper fixture 50 is provided, the upper support 59 of which is secured to the sleeves by split clamps 59a through screws 59b. In practice, in order to accommodate workpieces of different lengths, the upper support 59 upon loosening of the screws 59b may be slid along the sleeves 46 to the desired position. The support is open between the sleeves and receives and supports at substantially uniformly spaced circumferential points three vertical cylinders 74 having pistons 75 reciprocable therein from which depends rods 76. These rods support an annular housing member 77 forming a part of the upper fixture 50 and which through spaced antifriction bearings 78 and 79 supports an annular member 80 and an external sleeve 81 connected together through plate 82. The annular member 80 through plate 83 supports an upper chuck 84 which preferably is of the same type as the lower chuck 71. The sleeve 81 is provided with gear teeth 85 which mesh with a pinion mounted on the shaft 86 of a motor 87 carried by the supporting housing 77. The gear and pinion being identical in gear ratio with the gear 73 and pinion 73a and otherwise, as are the motors 72 and 87, to effect rotation of the two chucks at identically the same speed.

The cylinders 74 are connected together at bottom and top by manifolds 88 and 89, the manifolds 88 and 89 connecting the lower and upper ends of the cylinders respectively as indicated at 90 and 91. The manifolds are each provided with a connection 92 secured to the side of the support 59 and from thence to the source of operating pressure through flexible conduits 93 and 94.

The apparatus as illustrated in Figures 1 and 3 shows the heating head 54 and the quenching head 57 in operative position for the start of the heat treating operation, the carriage being in elevated position. To commence the heat treatment of the internal surface of the workpiece W it is merely necessary to energize the heating head 54, supply quenching fluid to the quench head 57 and move the carriage downwardly to effect relative axial movement of the two heads on the one hand and the workpiece on the other hand.

Since in order to place the workpiece in the position shown, the heat head and the quench head 57 must be separable from one another, provision is made for elevating the quench head into the position shown and retracting the same to a lower position through the elevating and retracting apparatus 58 which includes a fluid pressure cylinder 95 and piston 96 to which latter the quench head supporting tube 97 is connected. The cylinder 95 is supported beneath the bracket 56 through the upper cylinder head 98, the latter having a flange 99 bolted to the under side of the bracket 56. The cylinder 95 is threaded into the upper cylinder head as at 100 and telescoped with a skirt extension 101 thereof. The lower end of the cylinder 95 is closed by the lower cylinder head 102 and a port 103 for supplying fluid under pressure to the lower end of the cylinder is provided therein.

In order to provide for the supply of quenching fluid to the heating head 57, the piston 96 is so constructed and arranged as to act as a slide valve to the end that the quench head when in elevated position may be supplied with quenching fluid through the tube 97. The piston 96 is provided with a central annular groove 104 adapted to cooperate with a series of ports 105 in the wall of and at the upper end of cylinder 95, the ports connecting with an internal annular passage 106 in the depending skirt 101 of the cylinder head so as to provide a passage to the annular groove 104 in the piston from a quenching fluid supply pipe 107 connecting with the internal groove 106. The hollow tube 97 is connected to the piston through a split key 108 and threaded lock ring 109 and is aligned with a central axial bore 110 extending through the piston and which bore is capped at its lower end by the flanged combined packing retaining nut and plug 111. The annular groove 104 is connected to the central port 110 through radial ports 112. The upper head 98 is additionally provided with a fluid passage 113 at the end of cylinder 95 for the admission of fluid to the upper end thereof for acting on the upper side of the piston for lowering the quenching apparatus under fluid pressure.

In order to provide for the drainage of quenching fluid supplied within the workpiece W from the quench head 57, the spindle 60 of the lower rotatable support is larger in diameter than the piston rod 97 to provide an adequate annular drain passage to a point adjacent the bottom of the lower motor support casing member 71, which is secured to the main chuck support 47, both being non-rotatable.

The bottom of the gear casing and motor support member 71 is provided with a central aperture 114 and an upstanding sleeve 115, the sleeve having at its upper end a fluid-tight washer 116 engaged with the lower end of the spindle 69. A chamber 117 through which the quench tube 97 passes is provided with a water-tight packing 118 at its lower end and is secured to the underside of the bottom of the motor support and gear casing 71 and in alignment with the aperture 115, the chamber being provided with an offset drain pipe 119 so that the quenching fluid passing downwardly through spindle 69 may be carried away therethrough.

Figure 7:
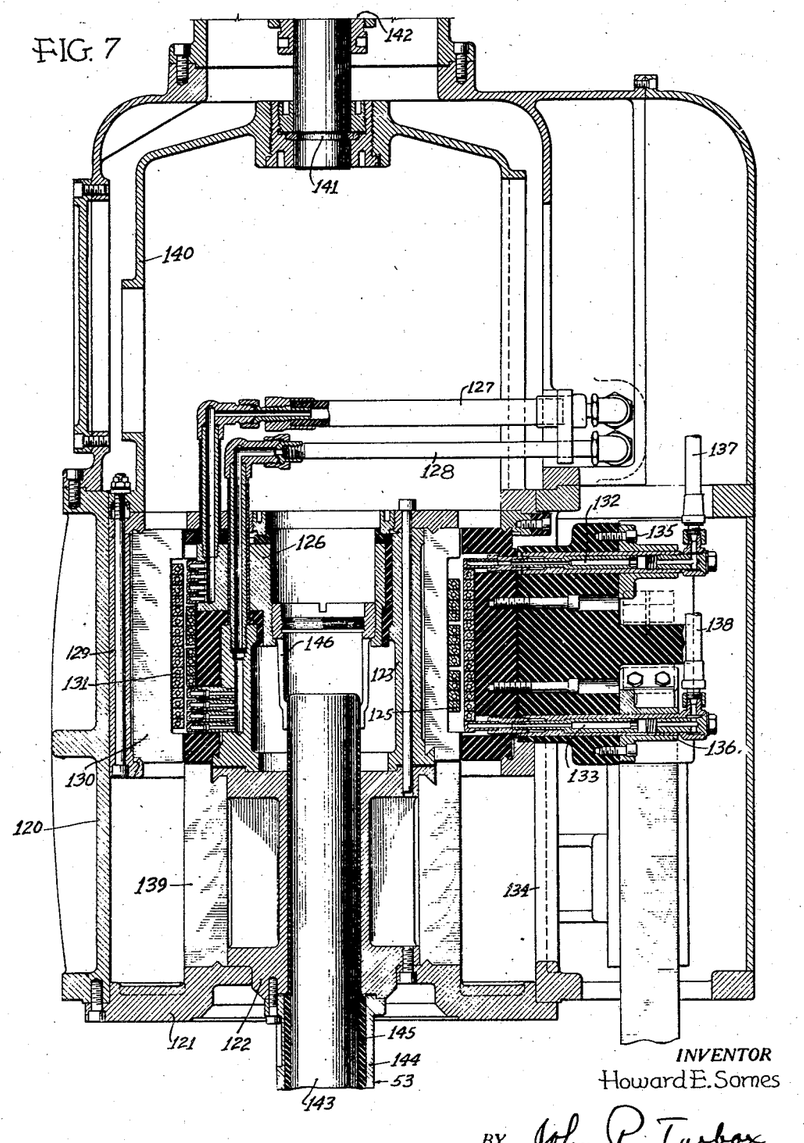
Figure 7 is an enlarged vertical section taken through the switching transformer to show the general arrangement of the parts thereof.

The switching transformer 52 as shown in Figure 7, which is more clearly shown and described and is claimed in my Patent No. 2,348,032, the application for which was a division of this application, includes, in general, a housing 120 having a bottom supporting plate 121 which supports an annular member 122 which in turn supports an annular secondary element, the secondary element embodying a support 123, a surrounding magnetic core 124 and a water cooled secondary winding 125. One terminal of the winding 125 is electrically connected to the support 123 and the other to an annular ring 126 within and insulated from the support 123. Suitable cooling water conduits 127 and 128 are connected through the support 123 and ring 126 respectively to the winding terminals for conducting cooling water through the winding.

The primary element of the transformer is annular in form and embodies an annular shell 129 which houses the magnetic core 130 and water cooled primary winding 131, the terminals 132 and 133 thereof extending outwardly through the shell 129 and an elongated slot 134 in the casing 120 and are connected to terminals 135 and 136 respectively which lead to the source of power (not shown). Suitable flexible water conducting conduits 137 and 138 are connected to the terminals 135 and 136. The primary winding supporting shell 129 is slidable in the casing 120 from the coupled position shown in Figure 7 to an uncoupled position adjacent the plate 121 in surrounding relation with respect to a magnetic element 139 by the annular member 140 which is connected to an actuating rod 141. The rod 141 is connected to a piston (not shown) which is arranged within the motivating cylinder 142 mounted on top of the transformer casing 120. The mechanism for actuating the primary element may be of any suitable fluid pressure operated type.

The arbor 53 embodies concentric inner and outer conductors 143 and 144 respectively insulated from each other by an insulating sleeve 145, the inner conductor 143 being electrically connected with the ring 126 through connector 146 and the outer conductor being connected with the support 123 through the annular member 122, the latter being insulated from member 122.

The conductors 143 and 144 at their lower ends (see Figure 10) are internally and externally threaded respectively to receive heating head adaptor elements 147 and 148. The adaptor element 147 is hollow at its opposite ends and has an internal web 149 provided with an axial threaded opening and surrounding passages 150. The element 147 is threaded into the inner conductor 143 and is insulated as at 151 from the outer conductor 144. Adaptor element 148 is of an annular formation threaded to the outer conductor 144 and having downwardly extending contactor fingers 152.

Figure 10:
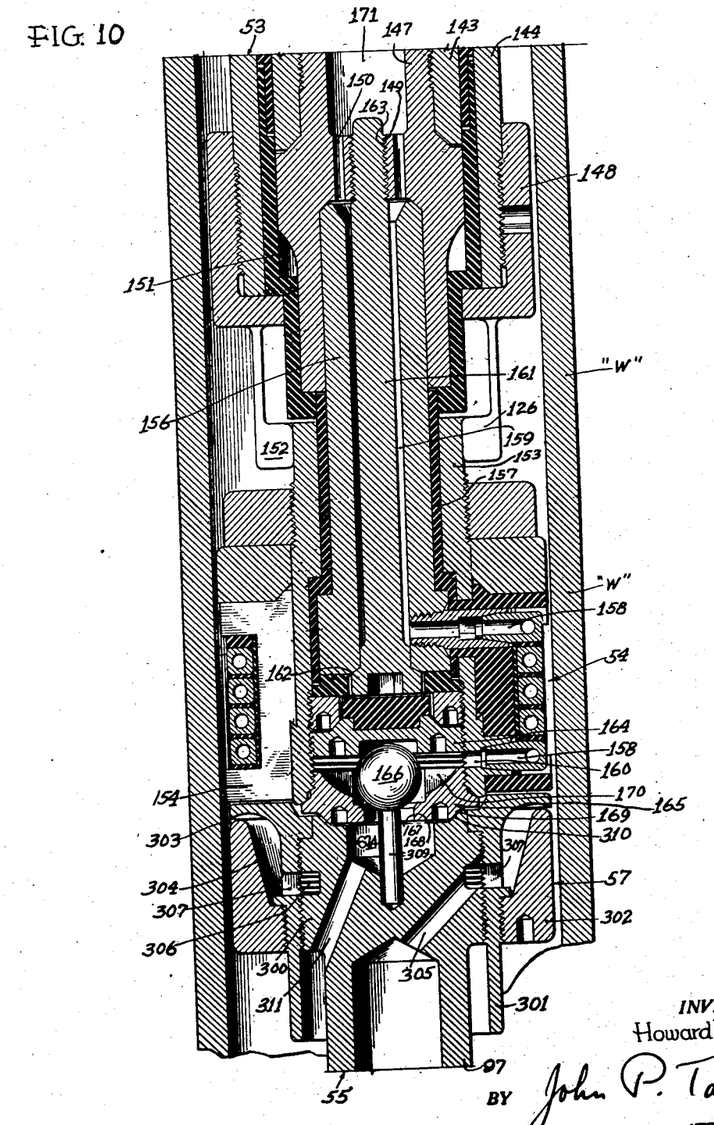
Figure 10 is a vertical section taken substantially on line 10—10 of Figure 3 to show the structural details of the heat and quench heads.

The heating head 57, which forms the subject matter of and is described and claimed in my copending application Serial No. 336,129, filed May 20, 1940, comprises in general, an annular support 153 supporting a surrounding core 154 which in turn supports a tubular heating coil 155, and an internal hollow sleeve 156 insulated by a non-conducting sleeve 157 from the support 153. One end of the coil 155 is insulated from and extends through the support 153 and is electrically connected to the sleeve 156, the connection being hollow to provide communication between the coil passageway 158 and the bore 159 of the sleeve 156. The opposite end of the coil 155 is connected to the support 153 which has a passage 160 through the wall thereof communicating with the coil passageway 158.

The sleeve 156 fits snugly within the end of the adaptor 147 in electrical contact therewith and the support 153 extends within the contactor fingers 152 in electrical contact therewith, the head being secured to the adaptor element 147 by a bolt 161 extending through the sleeve 156 in spaced relation except for its head portion 162, and threaded within the web 149 of the adaptor element as indicated at 163. The lower end of the annular support is provided with a valve means comprising an upper valve part 164 threaded into the lower end of support, a lower annular valve part 165 also threaded into the same end of the support but spaced from the part 164 to provide communication between the support passage 160 and the space 170 between the parts 164 and 165, and a ball member 166 normally closing the axial opening 167 in the end 168 of the lower valve part 165. The end of the part 165 is conical as indicated at 169.

The inner conductor 147 of the arbor 53 is tubular to provide a passage 171 for conducting cooling fluid through the inner adaptor passages 150 and thence through the sleeve bore 159 to the heating coil 155.

Figure 8:
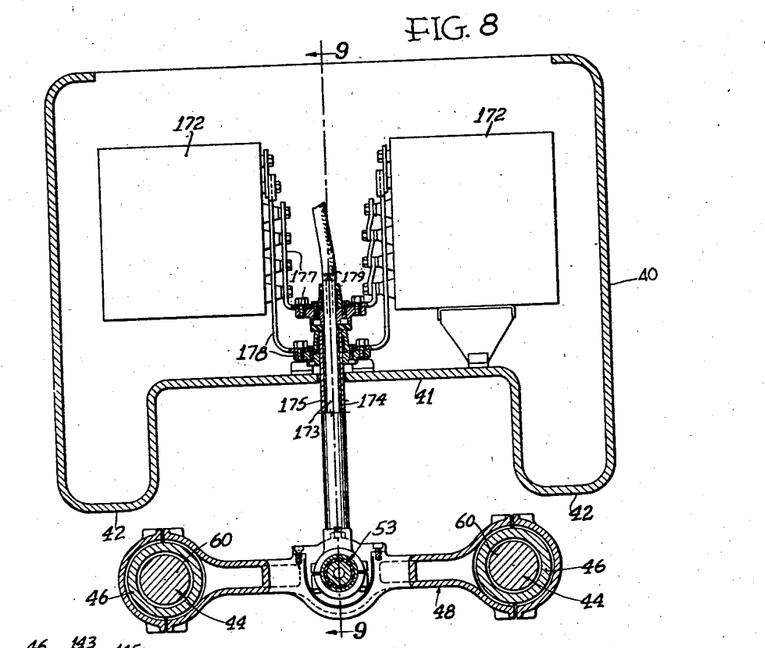
Figure 8 is a horizontal section taken in the region of the upper cross head of the work carriage to show the capacitors and the arrangement for conducting cooling fluid to the heat head arbor.
Figure 9:
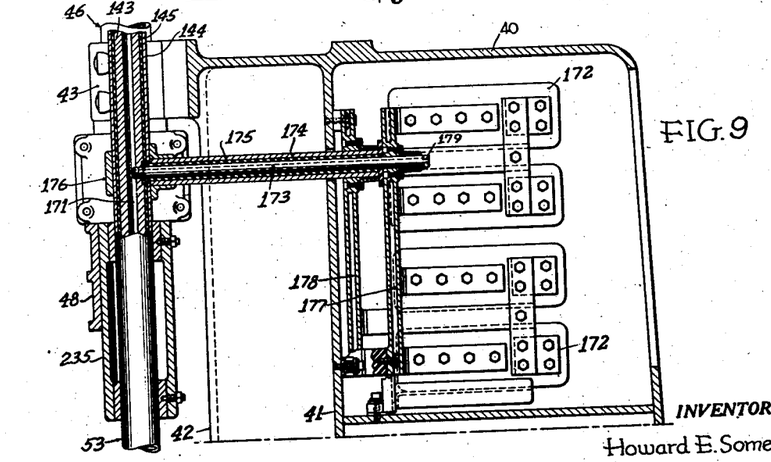
Figure 9 is a section taken substantially on line 9—9 of Figure 8.

Since it is desirable to provide a capacitance connected in parallel with the secondary of the transformer and the heating head, a plurality of capacitors 172 (see Figures 2, 8 and 9) are provided within the frame 40 near the top thereof. Connections to these capacitors are provided through a pair of concentric tubular conductors 173 and 174 separated by an insulating sleeve 175, the conductor 173 being threaded into the arbor conductor 143 and the conductor 174 being electrically connected to the outer arbor conductor 144 by a suitable connector 176. Suitable connections 177 and 178 extend from the other ends of the conductors 173 and 174, respectively, to the capacitors 172. Connected with the inner conductor 173 is a conduit 179 for conducting cooling fluid through the conductor 173 to the inner conductor of the arbor. This conduit connects through a manual shut off valve 180 with conduit 181 which receives cooling fluid under pressure from a motor driven pump 182 (see Figure 15). Associated with the conduit 181 is a flow switch 183, the function of which will be later described.

The quench head 54 (see Figure 10) is comprised of the enlarged upper end 300 of the tube 97 which supports annular inner and outer parts 301 and 302, parts 301 and 302 being axially spaced to provide a circumferential discharge passage 303 and having a supply chamber 304 therebetween which receives quenching fluid from the bore of the tube 97 through a passage 305 and circumferential recess 306 in the enlarged upper end and ports 307 in the wall of part 301. The upper end 300 is provided with an axial pocket 308 and an upstanding pin 309. The upper end is also provided with a conical wall 310 which when the heads are brought together engages the conical wall 169 of the heat head valve part 165 in fluid tight sealed relation. In this position of the heat head and quench head, the pin 309 raises the ball 166 from its seat to permit the flow of cooling fluid into the pocket 308. The cooling fluid flows from the pocket 308 through a downwardly extending passage 311 formed through the enlarged end 300. Quenching water, as well as water under pressure for lowering the quench head 57, is taken from the water main 184 (see Figure 15) and after passing through a filter 185 and the same raised in pressure by a booster pump 196, is delivered through pipe 107 to the cylinder 95. Water from the same supply and under the control of a valve 186 is delivered through pipe 113 to the cylinder 85 above the piston 96 for lowering the quench head 57.

Figure 15:
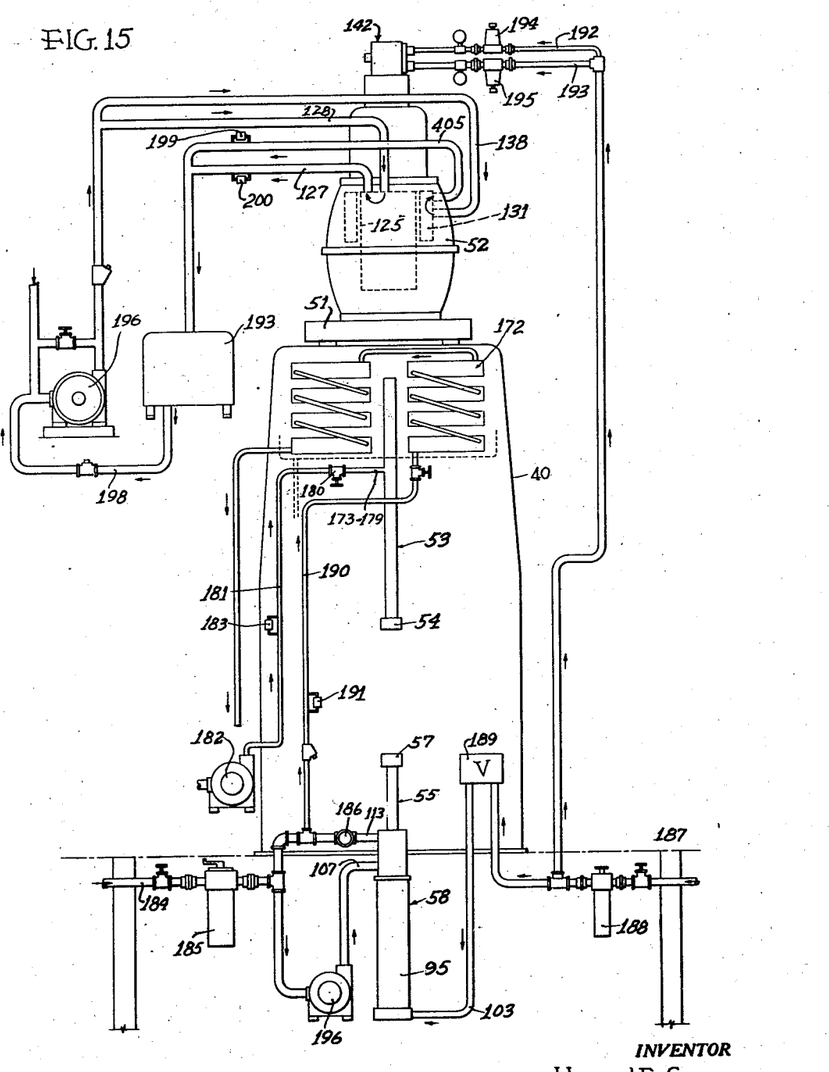
Figure 15 is a diagrammatic illustration of the cooling and quenching apparatus and of the fluid pressure controls therefor.

Cooling water is delivered from the same source through conduit 190 having a flow switch 191 therein for cooling the capacitors 172.

Air from a source of air pressure (not shown) is delivered through conduit 187 having an air filter 188 therein and thence through a control valve 189 to the conduit 103 for delivery to the cylinder 91 into the space below the piston 96 to raise the quench head 57.

Air from conduit 187 is also supplied to conduits 192 and 193 for controlled delivery through valves 194 and 195 respectively to the actuating mechanism 142 (see Figure 1) for effecting switching movement of the transformer primary winding 131.

Circulation of cooling fluid through the transformer windings is effected through the medium of a circulating pump 196 which delivers the cooling medium from a source (not shown) to the primary and secondary conduits 138 and 128 respectively. The cooling fluid returning through primary and secondary conduits 137 and 127 respectively first flows through a radiator 197 and thence through conduit 198 back to the pump 196. Suitable flow switches 199 and 200 are associated with the return conduits 137 and 127 respectively for a purpose to be later described.

Figure 14:
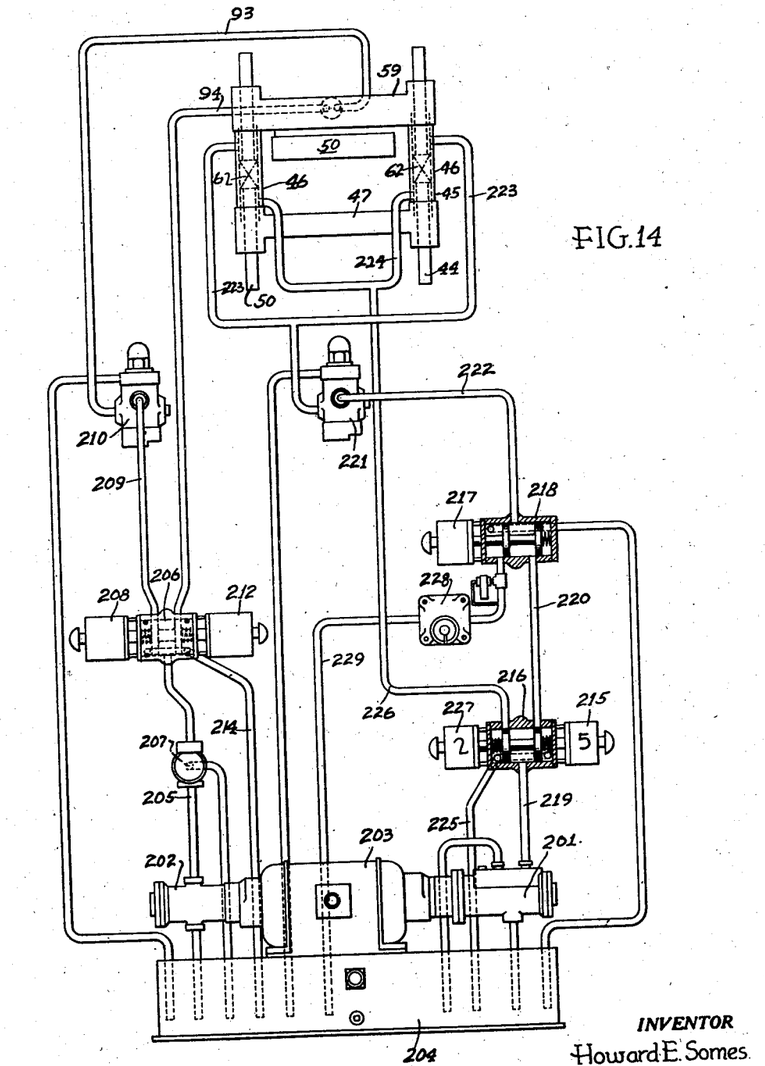
Figure 14 is a diagrammatic illustration of the hydraulic control system employed in conjunction with the apparatus.

With reference to the means for effecting reciprocation of the carriage cylinders 46, the fluid pressure actuating system therefor is diagrammatically shown in Figure 14. A dual supply of oil or other fluid under pressure is provided by pumps 201 and 202 which are driven by a motor 203, the pumps delivering the actuating fluid from a sump 204.

The pump 202 delivers fluid under pressure through pipe 205 to a magnetically actuated control valve 206, there being a pressure relief valve 207 in pipe 205 for relieving line pressure when control valve 206 is in the center position indicated. Raising of the upper chuck fixture 50 is effected by energizing valve solenoid 208 of the control valve 206 to shift the valve 206 so as to deliver fluid to conduit 209 through a check valve 210 and thence through conduit 93 to the manifold 88 in the upper cross support 59 (see Figure 3) and thence to the cylinders 74. Lowering of the chuck is prevented by check valve 210 which is spring biased and prevents return flow of fluid except under positive pressure. To lower the chuck fixture 50, valve solenoid 208 is deenergized and valve solenoid 212 of valve 206 is energized to supply fluid through conduit 94 and thence to manifold 89 (see Figure 3), which forces the pistons in cylinders 74 downwardly, forcing the discharge of fluid through conduit 93 and overcoming the bias of the check valve 210, thereby permitting drainage of the fluid to the sump 204 through valve 206 and pipe 214.

Upward and downward movement of the carriage is effected through the application of fluid under pressure derived from pump 201 which is so adjusted as to deliver fluid under specific pressure whereby to provide for accurate control. Upward movement of the carriage is effected by energizing valve solenoid 215 of control valve 216 and valve solenoid 217 of control valve 218 whereby fluid under pressure will pass from pump 201 through conduit 219, control valve 216 and conduit 220 to control valve 218. From valve 218, fluid under pressure flows through a biased check valve 221 by way of conduit 222, to pipes 223 which extend within guide rod portions 61 (see Figure 3) and admit fluid into the cylinders 46 above the pistons 62, the fluid under pressure thus elevating the carriage to the position shown in Figure 3, this being the position for the start of the heat treating position. During the upward movement, the fluid in the cylinders at the under sides of the pistons 62 is discharged through passages 65 (see Figure 3) and thence through pipes 224, also within the guide rod portions 61 (see Figure 3), pipe 226, and through control valve 216 to the sump 204 by way of drain pipe 225.

Lowering of the carriage may be effected in two ways, one of which is accurately controlled as to rate of movement, and which is employed during the actual heat treatment, whereas, the other is faster and permits the rapid return of the carriage to the starting position.

The controlled rate is effected by the energization of the valve solenoid 227 associated with control valve 218 (this, of course after deenergization of solenoid 215) so as to deliver fluid under specific pressure from the pump 201 through pipes 226 and 224 to cylinders 46 below the pistons 62 thereby lowering the carriage. Lowering movement is restricted, however, by the discharge of fluid from the upper ends of the cylinders 46 and through pipes 223 and 222 and the valve 218, the solenoid 217 of which is deenergized during this movement, by a metering valve 226, the valve 226, discharging the fluid through pipe 229 for return to the sump 204. The metering valve 226 is so adjusted as to fix the rate at which fluid may discharge to the sump to thereby positively control the downward carriage movement so long as valve solenoid 217 is deenergized and the metering valve 226 positively connected in the discharge circuit. For rapid downward movement, the solenoid 217 may be energized by shifting the valve 218 to permit fluid return through pipe 220, valve 218 and pipe 225 to the sump 204, it being understood that solenoid valve 227 is energized at this time.

Figure 12:
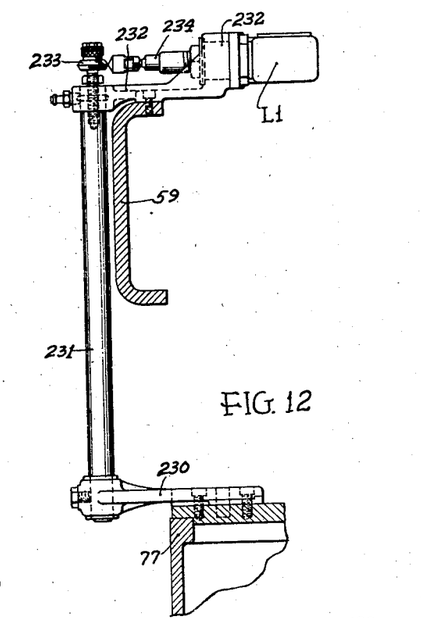
Figure 12 is a side elevation of a control feature of the apparatus, the parts being associated with the part of the apparatus illustrated in the upper portion of Figure 3 but removed therefrom as a result of the section therein illustrated but appearing in Figure 1.

Since it is essential for safe operation of the machine that the lower and upper chucks 71 and 84, respectively, be precisely in correct engagement with the workpiece W and that the workpiece be of the proper length, a limit switch L—1 is provided to prevent operation of the apparatus in the event the chucks do not accurately position themselves with respect to each other for a given workpiece. For this purpose, as will appear in Figure 1, the upper chuck fixture 50 is provided with a bracket 230 (see also Figure 12) secured to the housing 77 to which bracket an upwardly extending rod 231 is secured, the rod 231 being arranged to reciprocate, with the upward and downward chuck opening and closing movement of the upper chuck fixture, through a guide bracket 232 secured to the upper support 59. The upper end of the rod 231 is provided with an adjustable cam 233 adapted to engage a slidable plunger 234 which actuates the contacts of the limit switch L—1, the limit switch being fixed to the bracket 232. Thus, the upper chuck 84 must be in a predetermined lower workpiece engaging position before the plunger of the limit switch L—1 can be engaged by the cam 233, Figure 12 showing this engaged position. The operation of the limit switch L—1 in the system will be presently described.

The uppermost cylinder bridging member 48 (see Figures 1 and 9) is provided with a depending sleeve 235 slidable on and surrounding the heat head arbor 53 which during downward heat treating movement of the carriage serves to prevent any possible lateral deflection of the arbor and heat head relative to the workpiece whereby to insure accurate axial alignment during the heat treating operation.

Figure 11:
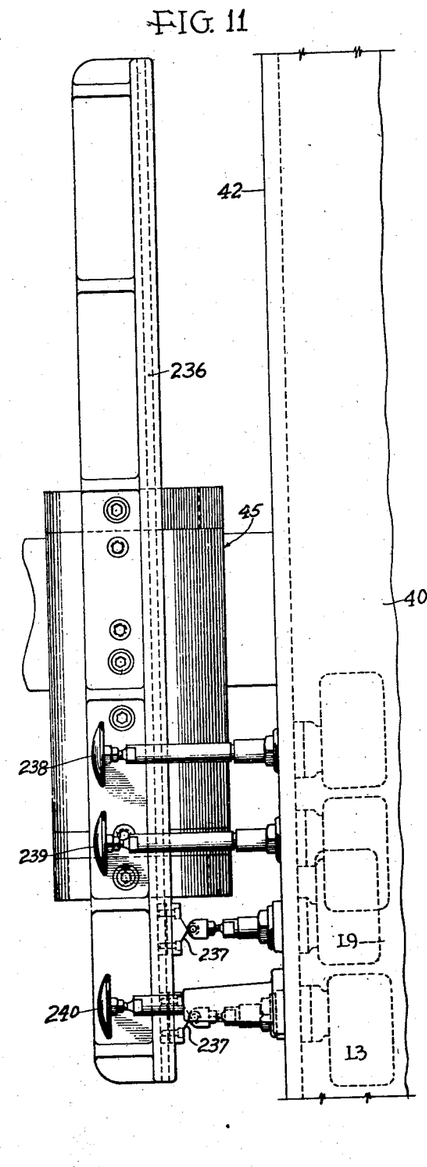
Figure 11 is an enlarged view in elevation of a portion of the right side of the apparatus illustrated in Figure 3.

In order to automatically control the carriage movement and other functions of the apparatus, including the heating and quenching operations, which depend upon the movement of the carriage, cam carrying bars 236 having adjustable cams, generally designated 237, thereon, are secured to the carriage cylinders 46 (see Figures 1, 3 and 11). These cams are adapted to open and close various limit switches L—2 to L—9, mounted on the columns 42 of the frame 40, during upward and downward movement of the carriage. The operation and function of these limit switches will be presently described.

Associated with the front of the machine for convenient access are several manual control switches, viz, a master safety on and off switch 238, a safety heat-off switch 239, and a master starting switch 240.

The automatic control of the operation of the machine, after initial starting, is mainly by a sequence controller 241 shown in dotted outline in Figure 2, and driven by an electric motor 242, the controller being mounted in the framework 40 at the rear of the machine. This controller, which forms the subject matter of my divisional application, Serial No. 450,034, filed July 7, 1942, may be of the drum type for actuating a number of switches A to L, respectively, in predetermined sequence (see Figure 13 and the wiring diagram of Figure 16).

Figure 16:
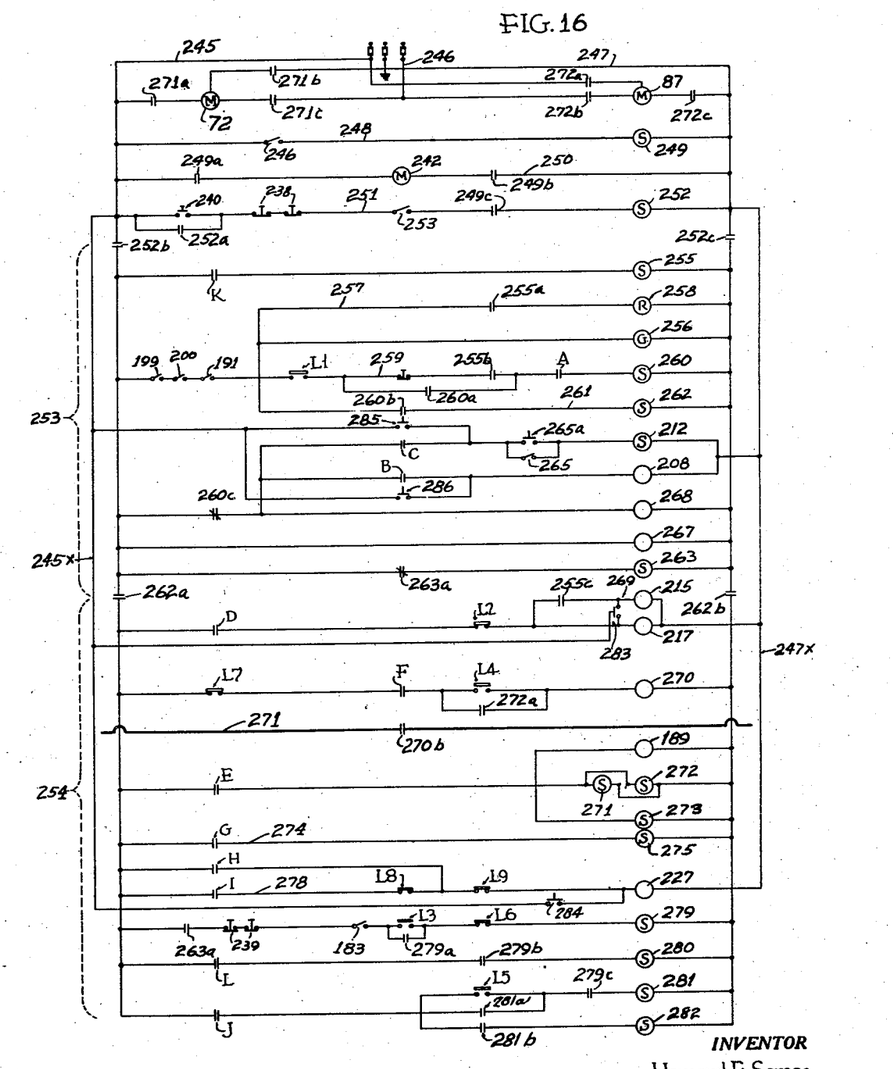
Figure 16 illustrates a wiring diagram through which automatic operation of the apparatus is achieved.

To best understand the automatic operation of the apparatus, reference may be had to the diagram of Figure 16. Before describing the operation, it will be necessary to first consider the function of the various limit switches which with the sequence controller provide a space-time control.

Limit switch L—1 operates to close a circuit only when the top and bottom chucks are in proper spaced arrangement and engagement with the workpiece W, which circuit must be closed before further operation of the machine can result.

Limit switch L—2 is a closed circuit switch which is opened by the carriage when elevated to a desired position or upper limit.

Limit switch L—3 is a pre-set safety switch and is closed at the upper limit or position or at a particular point in the initial downward travel of the carriage, closure thereof being required before the high frequency power can be applied to the transformer and coil of the heating head.

Limit switch L—4, normally open, is closed upon the carriage moving toward or approaching an elevated position and after the sequence controller contacts F are closed to establish field excitation in the high frequency generator in anticipation of heat treatment.

Limit switch L—5 is closed at the upper limit or at a particular point in the initial downward travel of the carriage, closure thereof being required before the switching transformer can operate to coupled position.

Limit switch L—6, normally closed, is adapted to be opened upon the carriage arriving at a lower position at the end of the heat treating operation to terminate the heating.

Limit switch L—7, normally closed, is opened upon the carriage arriving at the end of its heat treating movement, and opens the field excitation circuit of the generator.

Limit switch L—8, normally closed, terminates the constant speed downward movement of the carriage.

Limit switch L—9, normally closed, is operative to terminate the final downward movement of the carriage.

The sequence controller switches A to L are all open circuit switches and operate to close circuits at predetermined times, as now will be described.

Referring to Figure 16, current is delivered through a three phase line 245, 246 and 247, and to commence operation, the switch 246 for the sequence controller motor 242 is closed which establishes a circuit 248 with the phase 245, 247. Included in this circuit is a solenoid 249 which when circuit 248 is energized closes switches 249a and 249b in circuit 250 which includes the sequence controller motor 242, thus starting the sequence controller 241 in operation. Energization of solenoid 249 also closes a switch 249c in a circuit 251 to condition this circuit for operation which includes a solenoid 252 in series with the normally open master starting switch 240 and the normally closed master safety switches 238. Included also in this circuit is a manually closable switch 253 which is closed normally, but is shown as open in Figure 16. Bridging the master switch 240 is a locking circuit which includes a normally open switch 252a actuatable by solenoid 252.

The circuit 251 constitutes a master starting circuit which is effective for energization on the closure of solenoid switch 249c. Further circuits are divided into two stages, viz., a first stage 253 and a second stage 254. Upon manual closure of the master control switch 240 the circuit 251 is energized which through energization of solenoid 252 closes switch 252a to lock out the master control switch 240 and closes switches 252b and 252c to connect the first stage 253 with phase wires 245, 247.

Figure 13:
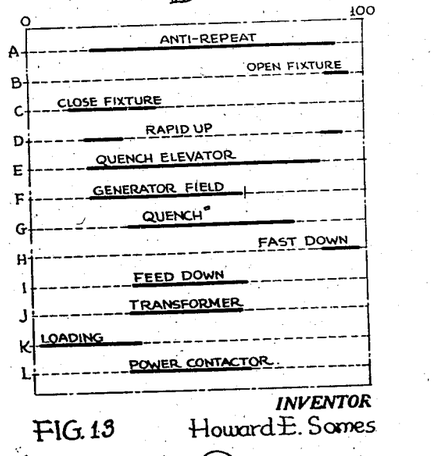
Figure 13 is an operation diagram illustrating the sequential operation of the sequence controller operated switches.

With additional reference now to Figure 13, which is an operation diagram the heavy lines A to L corresponding to the period of operation of the various elements by the sequence controller switches A to L, and the horizontal lines A to L, dotted and heavy corresponding to time intervals 0 to 100, after energization of the first stage 253, and upon closure of sequence controller switch K, relay solenoid 255 is energized which closes relay switch 255a. If flow switches 199, 200 and 191 (see Figure 15) are closed, in which case a lamp 256 (on the front of the machine) will be lit, thus indicating a normal flow of cooling fluid to the transformer primary winding, transformer secondary winding and the capacitors, a circuit 257 will be completed through relay switch 255a which through a signal lamp 258, on the front of the machine will indicate an interval during which loading of the workpiece into the carriage may take place. This interval is indicated by the heavy line K of Figure 13.

Upon loading the lower chuck with a workpiece W, the upper fixture and chuck may be caused to close upon the closure of sequence controller switch C, provided that the switch 265 is closed for automatic operation, a circuit being completed between the extension 247x of line 247 and line 245 through switch 265a, sequence controller switch C and valve operating solenoid 212, the latter operating to energize valve 206 (see Figure 14) to deliver fluid under pressure to the upper ends of cylinders 74 to lower the chuck into engagement with the workpiece W. Switch 265a is a joggle switch for use in obtaining slight movement for adjustment of the upper fixture. Closure of the limit switch L—1 is effected only when the upper chuck is in proper position.

Limit switch L—1, relay switch 255b, sequence controller switch A are arranged to complete a circuit 259 through relay solenoid 260 and flow switches 199, 200 and 191 to close relay switch 260a in parallel with relay switch 255b and to also close relay switch 260b which closes circuit 261, circuit 261 including a relay solenoid 262.

Previously upon energization of the first stage 253, the cooling water supply pump 196 and the oil pressure supply pump motor 203 having been set in operation by the relay switch solenoid 263 which is in series with the normally closed switch 264, which is a switch that must be closed first for automatic operation.

Energization of the second stage 254 is effected by the energization of relay solenoid 262 which closes the relay switches 262a and 262b. If, however, operation of the second stage apparatus is not desired, a timer motor 267 is adapted through clutch 268 to open switch 263a which stops the cooling water pump 182 and oil pump motor 836. As a result flow switches 199, 200 and 191 open and heat the circuit to the relay solenoid 260, switch 255b having been opened with the opening of sequence controller switch K unless the clutch has been released by the opening of normally closed switch 260c by the energization of relay solenoid 260. Such cutting out of these pumps will obviate needless operating of the same under the conditions stated.

With the energizing of the second stage 254, and through the subsequent closing of the sequence controller D the valve solenoids 215 and 217 of the carriage control are energized, the relay switch 255c in branch circuit 269 with solenoid 215, having been closed as a result of closure of sequence controller switch K and the energizing of relay solenoid 255. As a result, the carriage is caused to elevate until limit switch L—2 is opened by a cam on one of the cam bars, which thus deenergizes the control valve solenoids 215 and 217. During this upward movement of the carriage the sequence controller switch F closes, and limit switch L—4 also closes near the end of this stroke which energizes relay solenoid 270 to in turn close switch 270a, locking out limit switch L—4, and closing the switch in the generator field circuit 271. The high frequency generator is thereby prepared for power generation. It is to be noted at this point that one of the important features of the present invention is that if the limit switch L—1 failed to close during loading of the chucks with the workpiece, due to improper positioning of the workpiece or a workpiece of improper length which prevented lowering of the upper chuck to the exact predetermined position, relay solenoid 260 remains deenergized with the result that relay solenoid 262 is unable to cause energization of the second stage 254. Therefore, no damage can be caused to the apparatus incident to improper loading or loading with an improper workpiece.

When the carriage reaches its upper limit, sequence controller switch E closes to energize relay solenoids 271 and 272 to close motor switches 271a, 271b and 271c for the chuck rotating motor 72 and motor switches 272a, 272b and 272c for the chuck rotating motor 87, thus causing simultaneous rotation of the chucks and workpiece W. Also at this time valve solenoid 189 is energized causing compressed air to raise the quench head 57 into engagement with the heating head 54. At the same time, the booster pump 182 is set in operation through energization of solenoid 273.

When the quench head 57 engages the heat head 54 the pin 309 raises the ball valve 166 of the heat head (see Figure 10) from its seat to open the cooling fluid passage through the quench head pocket 308 and passage 311. Upon the booster pump 182 building up a predetermined pressure necessary for adequate cooling, the flow switch 183 closes. Sequence controller switch G then closes circuit 274 to cause energization of relay solenoid 275 to set the quench fluid booster pump 196 in operation to supply quenching water to the quench head 57.

At approximately this same time, sequence controller switch I closes circuit 228, energizing relay solenoid 227 of valve 216 resulting in the gradual and uniform downward feed of the carriage, the speed being controlled by the adjustment of the metering valve 228 (see Figure 14). As the carriage leaves or passes the limit switch L—3 in its initial downward movement, switch 263a, which was previously closed with the relay solenoid 263, acts through closed limit switch L—6 to energize relay solenoid 279 to close switch 279a, locking out limit switch L—3 which subsequently opens, and to close switch 279b upon closure of the sequence controller switch L. This operates the power relay 280 providing power to the switching transformer 52. Relay solenoid 279 also closes switch 279c so that when limit switch L—5 and sequence controller switch J close, relay solenoid 281 becomes energized. Energization of solenoid 281 closes relay switch 281a to lock out limit switch L—5 and closes solenoid 282 which through the actuating mechanism 64 (top of Figure 1) moves the transformer primary 131 into coupled relation with the primary secondary 125 whereby to supply current to the heating head 54.

If the booster pump 182 fails to supply cooling fluid to the heat head coil under sufficient flow conditions for adequate coil cooling, then flow switch 183 remains open and prevents energization of relay solenoid 279 and as a result the switching transformer cannot be actuated to supply current to the heat head coil.

Should emergency conditions require that the power be cut off, the manually operable heat-off switches 239 may be actuated to open the circuit to the relay solenoid 279, thereby opening the circuit to the relay solenoid 281 and transformer solenoid 282.

This all takes place at the early stage of the cycle as seen from the operating cycle of Figure 13, and is substantially the condition which prevails when the parts are in the position shown in Figure 3.

The carriage carries the workpiece W downwardly at a rate of, for example, one to two inches per second, depending upon the desired rate of heating of the bore of the workpiece to recalescence and quenching to produce the desired internal layer of metal.

As the carriage reaches the end of its controlled downward travel, which corresponds to the heating period (see J of Figure 13), limit switch L—8 opens the circuit to valve solenoid 227, thereby causing the carriage to dwell, and at substantially the same time sequence controller switch I opens, assuring the dwell at this time. At substantially the same time limit switch L—6 opens the circuit through relay solenoid 279 and as a result relay switches 279b and 279c open and the transformer solenoid 282 deenergizes, thereby cutting off the supply of power to the heat head coil.

After a predetermined dwell period, sequence controller switches H and D close to reestablish a circuit through valve solenoid 227 and a circuit through valve solenoid 217 causing the carriage to move downwardly at a rapid rate until limit switch L—9 is reached which then opens to deenergize valve solenoid 227 to cause the carriage to come to rest in its lowermost position. Sequence controller switches H and D open at about this time.

Sequence controller switch E opens just prior to the opening of switches H and D thus lowering the quench head by cutting off the air pressure, permitting water pressure to effect this retraction. Also, at the same time the high pressure cooling water to the heat head is cut off.

When the lowermost position of the carriage is reached sequence controller switch B closes to energize valve solenoid 208 and raise the upper chucking fixture to disengage the workpiece W and thereby permit removal of the workpiece.

Through the provision of jog switches 283 and 284, upward or downward movement of the carriage, at will, is provided for, the same deriving their energy for operating valve solenoids 227, 215 and 217 from the extension leads 245x and 247x. Similarly there are provided manual switches 285 and 286 bridging sequence controller switches C and B, and connected in circuit with extension leads 245x and 247x and valve solenoids 212 and 208 to open and close the upper chuck fixture at will.

The general operation of the apparatus should readily appear from the foregoing, particularly from the description relative to Figures 13 and 16. Briefly, however, with the carriage in its lowermost position, after setting the machine for automatic operation through closure of switch 265, the workpiece is loaded into the lower chuck during the period the light signal 258 is lit (see K of Figure 13). Thereafter, the upper chuck lowers to engage the upper end of the workpiece and the carriage is elevated to its uppermost position (see C and D of Figure 13). Thereafter, rotation of the workpiece commences, the quench head is elevated into engagement with the heat head and quenching fluid is supplied to the quench head (see E and G of Figure 13). Gradual downward movement commences together with actuation of the switching transformer and delivery of power to the heat head coil (see I, J and L of Figure 13), so that the workpiece is progressively heated and quenched throughout the desired length at which time movement is arrested for the dwell while the power is cut off and quenching and rotation continues. Thereafter rotation stops, the quenching head retracts and the carriage rapidly returns to its lowermost position, at which point the upper chuck fixture elevates to provide access for removal of the workpiece.

As heretofore pointed out a number of safeguards appear throughout the apparatus and its organization whereby failure of various parts thereof or failure of certain predetermined operating conditions acts to prevent injury to the apparatus.

Various features of the invention, although but briefly described herein, are disclosed and claimed in copending applications as follows:

Serial No. 336,129, filed May 20, 1940, and relating to the heating head and its cooperation with the quenching head; Serial No. 419,828, filed November 21, 1941, and relating to the quenching head; Serial Nos. 444,346 and 507,817, filed May 25, 1942, and October 27, 1943, respectively, and relating to the mechanism for actuating the quenching head; Serial No. 444,347, filed May 25, 1942, and relating to the work supporting carriage; and Serial No. 450,034, filed July 7, 1942, and relating to the sequence controller.

Though only one embodiment of the invention has been illustrated and described, it is to be understood that the invention is not limited thereto but may be embodied in various forms. For example, workpiece holders, heads etc., may be varied to hold and operate upon various types of workpieces and the operation of switches and mechanism may be varied to suit requirements as desired. As such changes in construction and arrangement of parts may be made without departing from the spirit of the invention as will be apprrent to those skilled in the art, reference will be had to the appended claims for a definition of the limits of the invention.

What is claimed is:

1. In an induction heat treating apparatus, a frame a heat treating coil supported from one end of said frame, a quenching device supported from the other end, work holding means mounted on said frame, means for moving said quenching device into and out of operative relation with said coil, means for moving said work holding means to place a workpiece held thereby in heat treating relation to said coil, means to energize said coil, and means responsive to the positioning of said quenching device in operative relation with said coil and associated with said energizing means for controlling the energizing of said coil.

2. In a high frequency heat treating apparatus, a heat treating coil having fluid cooling means associated therewith, a quenching device adapted to be moved into and out of operative relation to said coil, means interrelated to said quenching device and coil and their normal operative position with respect to one another for controlling the flow of fluid in said cooling means, and means dependent upon the flow of fluid in said cooling means for controlling the supply of current to said coil.

3. In an induction heat treating apparatus, an inducing head, a movable quenching head, means for relatively moving said heads into and out of operative relation with respect to each other, a movable work holding means having a movable work clamp thereon, means for moving said work holding means to place a workpiece clamped thereon in heating and quenching relation with said heads, means to energize said inducing head, a first control means associated with said energizing means and responsive to the positioning of said quenching head in operative relation with said inducing head for controlling the energizing of said head, and a second control means associated with said energizing means and with said moving means for said work holding means and being responsive to the movement of said work clamp for controlling the energizing of said heating head and the movement of said moving means, said first control means being ineffective to control the energizing of said heating head independently of said second control means.

4. In a heat treating apparatus having an electromagnetic inducing head; a quenching head; a work holder; means for effecting relative movement between said heads and work holder and an electrically operatable control device therefor; means for supplying electrical energy to said inducing head and an electrically operatable control device therefor; means for supplying quenching medium to said quenching head and an electrically operatable control device therefor; and a clamping device carried by said work holder and means for moving said clamping device to a predetermined position to properly locate a workpiece to be heat treated in said work holder; control means therefor comprising a source of electric current, an operating circuit connected with said source and including said control devices and switch means for making and breaking the connections between said source and operating circuit, electrically operatable means for closing and opening said switch means, a conditioning circuit connected with said source and including said electrically operatable means and having starting contacts and a normally open switch therein, said normally open switch being actuatable to closed position solely upon movement of said clamping device to said predetermined position whereby upon closure of said starting contacts energization of said electrically operatable means to connect said operating circuit with said source is dependent upon said clamping device being in its said predetermined position.

5. In a heat treating apparatus having an electromagnetic inducing head; a quenching head; a work holder; means for effecting relative movement between said heads and work holder and an electrically operatable control device therefor; means for supplying electrical energy to said inducing head and an electrically operatable control device therefor; means for supplying quenching medium to said quenching head and an electrically operatable control device therefor; and a clamping device carried by said work holder and means for moving said clamping device to a predetermined position to properly locate a workpiece to be heat treated in said work holder; control means therefor comprising a source of electric current, an operating circuit connected with said source and including said control devices and switch means for making and breaking the connections between said source and operating circuit, electrically operatable means for closing and opening said switch means, a conditioning circuit connected with said source and including said electrically operatable means and having starting contacts and a normally open switch therein, said normally open switch being actuatable to closed position solely upon movement of said clamping device to said predetermined position whereby upon closure of said starting contacts energization of said electrically operatable means to connect said operating circuit with said source is dependent upon said clamping device being in its said predetermined position, said clamping device moving means having an electrically operatable control device in said conditioning circuit in parallel with said starting contacts and normally open switch.

6. In a heat treating apparatus having a quenching head, an electromagnetic inducing head provided with means for supplying electric energy thereto, an electrically operatable switch means for controlling said supply of energy and a cooling passage therein for cooling fluid, and means for relatively moving said heads into and out of operative relation; control means comprising a source of electric current, a control circuit connected with said source and including a switch and said electrically operatable switch means for energizing and deenergizing said switch means, means responsive to a change in the flow of cooling fluid through said passageway for actuating said switch, and means responsive to the positioning of said heads in operative relation to change the flow of cooling fluid through said passageway whereby said flow responsive means actuates said switch.

7. In a heat treating apparatus having a quenching head, an electromagnetic inducing head provided with means for supplying electric energy thereto, an electrically operatable switch means for controlling said supply of energy and a cooling passage therein for cooling fluid, and means for relatively moving said heads into and out of operative relation; control means comprising a source of electric current, a control circuit connected with said source and including a switch and said electrically operatable switch means for energizing and deenergizing said switch means, means responsive to a change in the flow of cooling fluid through said passageway for actuating said switch, and means responsive to the positioning of said heads in operative relation to change the flow of cooling fluid through said passageway whereby said flow responsive means actuates said switch, said positioning responsive means comprising a normally closed valve in said passageway and arranged to be opened by said quenching head in said position of operative relation.

8. In an induction heat-treating apparatus, an inductor, a quenching head, said inductor and head being relatively axially movable into and out of an adjacent heat-treating position, means for effecting said relative movement, means for energizing said head, and control means associated with said inductor, said quenching head and said energizing means, said control means being responsive to the relative movement of said inductor and quenching head and operative to cause energization of said inductor when said inductor and quenching head are in said adjacent heat-treating position and precluding energization of said inductor in the absence of said adjacent heat-treating position.

9. In an induction heat-treating apparatus, an inductor having a cooling fluid passage associated therewith, a quenching head, said inductor and quenching head being relatively movable into and out of a position of adjacent relationship, means for effecting said relative movement, means for supplying electrical energy to said inductor to energize the same, means for supplying cooling fluid to said passage, control mechanism associated with said passage and quenching head and responsive to movement of said inductor and quenching head to said position of adjacent relationship to permit predetermined flow of cooling fluid through said passage, and means responsive to said flow of cooling fluid and associated with said energy supplying means to preclude energization of said inductor in the absence of said predetermined flow of cooling fluid.

10. The combination with an electromagnetic inducing head having a cooling passage therein, and a quench head, which said heads are relatively movable into and out of a predetermined position of adjacent relationship, of means operative in said position of adjacent relationship for establishing a flow of coolant through said passage, an energizing circuit for said inducing head, means for opening and closing said circuit, and means effective at a predetermined rate of coolant flow through said passage to cause said opening and closing means to close said circuit and effective at a rate of coolant flow less than said predetermined rate to open said circuit.

HOWARD E. SOMES.